W. J. KENT.
MACHINE FOR TRIMMING RUBBER MATS.
APPLICATION FILED JAN. 2, 1920.
1,359,072.
Patented Nov. 16, 1920.
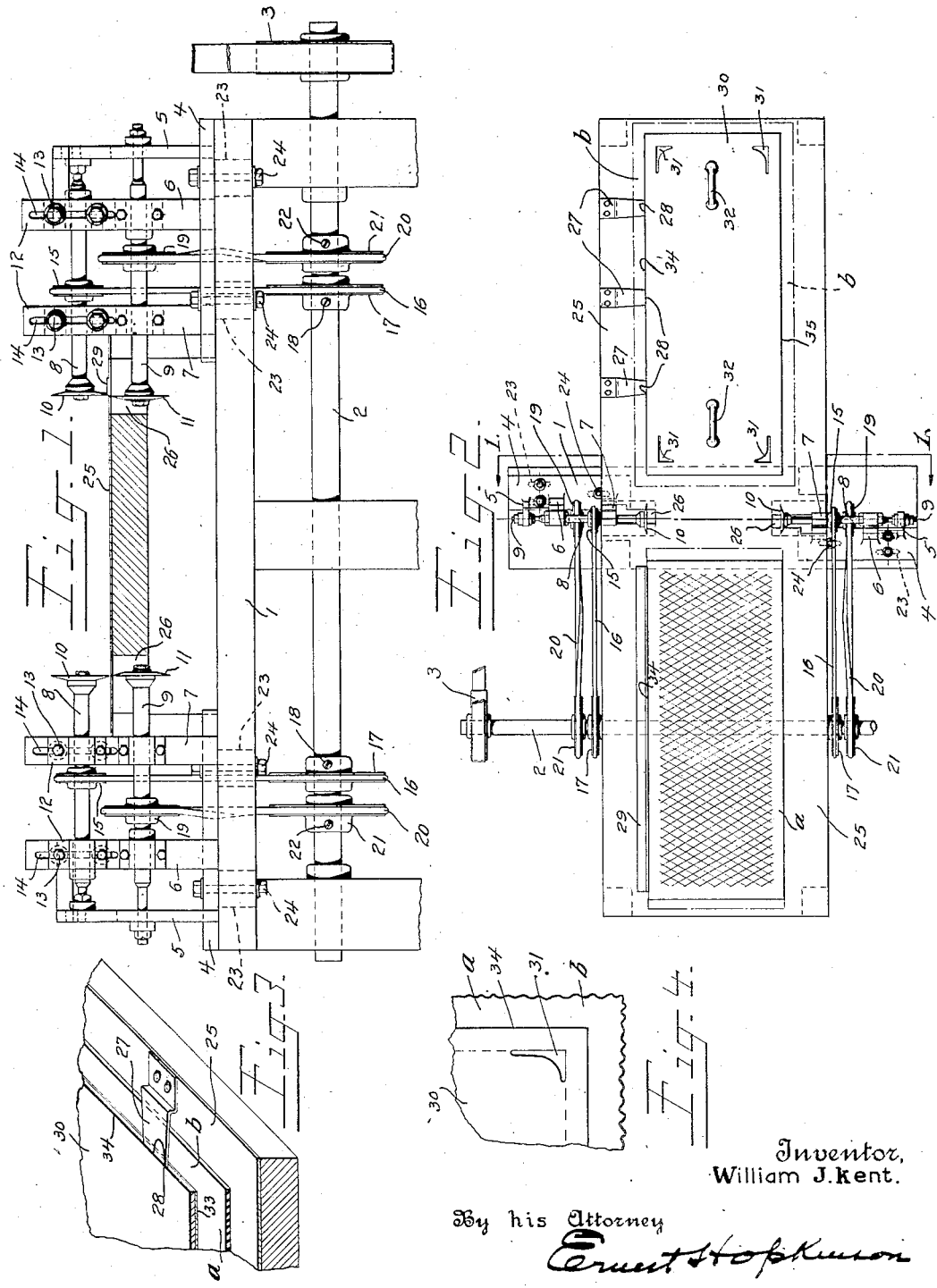
Inventor,
William J. Kent.
By his Attorney
Ernest Hopkinson

UNITED STATES PATENT OFFICE.

WILLIAM J. KENT, OF BROOKLYN, NEW YORK, ASSIGNOR TO THE MECHANICAL RUBBER COMPANY, A CORPORATION OF NEW JERSEY.

MACHINE FOR TRIMMING RUBBER MATS.

1,359,072.  Specification of Letters Patent.  Patented Nov. 16, 1920.

Application filed January 2, 1920. Serial No. 349,123.

*To all whom it may concern:*

Be it known that I, WILLIAM J. KENT, a citizen of the United States, residing in the borough of Brooklyn, city of New York, county of Kings, and State of New York, have invented certain new and useful Improvements in Machines for Trimming Rubber Mats, of which the following is a full, clear, and exact description.

This invention relates to a machine for trimming the edges of rubber mats to finished form.

Previously in finishing these mats the entire operation of trimming their edges has been performed in a slow and laborious manner by hand. Each mat comprises a central portion formed in a desired roughened design and a surrounding edge portion which it is desirable to trim at a uniform distance from the central design in order to form a border. In trimming this portion manually the operator makes use of a straight edge, a rule and square, and after defining the edge of the border by means of these implements the superfluous portion beyond the border is manually cut away with a knife.

The object of the present invention is to provide a simple, economical and easily operated machine by which the trimming operation can be accomplished with great speed and accuracy as compared to the previous method of trimming by hand.

For a complete disclosure of the invention reference is had to the accompanying drawings, in which:

Figure 1 is a transverse sectional view through the machine.

Fig. 2 is a top plan view.

Fig. 3 is a broken perspective showing the manner in which the templet is guided, and Fig. 4 is a broken top plan view showing the manner in which the template is centered on the mat.

Referring to the drawings 1 indicates a main frame in which is supported a shaft 2 which may be driven by the pulley 3 or in any other desired manner. On the top of the frame a cutting mechanism is adjustably mounted at each side, which cutting mechanisms are identical in all respects, and a detailed description of but one of the mechanisms will be sufficient. Each comprises a base 4 having uprights 5, 6 and 7 mounted thereon, and carried by these uprights are drive shafts 8 and 9 on the ends of which are mounted rotary cutters 10 and 11, respectively. In order to provide for a relative adjustment of the cutters 10 and 11 the upper shaft 8 is mounted on brackets 12 which have an adjustable connection with the uprights 6 and 7 by means of the bolts 13 and slots 14 in the uprights. The shaft 8 carries a pulley 15 which is connected by the belt 16 to a pulley 17, which latter by means of the set screw 18 is adjustably mounted on the shaft 2. The shaft 9 carries a pulley 19 which is connected by a belt 20 with a pulley 21, adjustably mounted on the shaft 2 by means of the set screw 22. In order to provide for a transverse adjustment of the cutting mechanism its base 4 is adjustably mounted on the main frame by means of the slots 23 in the top of the frame and the bolts 24 extending through the base 4 and said slots. Upon adjustment of the cutting mechanism in either direction the pulleys 17 and 21 on the shaft 2 are correspondingly adjusted by means of the set screws 18 and 22. The work bed 25, which has a smooth upper surface, extends longitudinally of the machine and at an intermediate point is provided with recesses 26 in which the lower rotary cutters 11 are disposed. A series of overhanging guides 27 are mounted at one side of the work bed in advance of one cutting mechanism with their edges 28 in alinement with its cutters, while on the same side of the bed and in rear of the cutters a continuous guide 29 is mounted in alinement with the cutters and the edges 28. A templet 30 is provided of the same size as the finished mat, and adjacent its corners guide or gage openings 31 are disposed for a purpose to be later described. The templet is also provided with handles 32, and its lower surface is roughened in any desired manner, a suitable means for securing this roughened surface being a sheet of sand paper 33 secured to the bottom of the templet as shown in Fig. 3.

In operation a mat *a* which is to be trimmed is laid on the work bed in advance of the cutters and the templet 30 superposed thereon, the templet being adjusted until the straight sides of its gage openings 31 correspond with the corners of the roughened design on the mat. It will be seen that with this arrangement the edges of the templet will define a border around the roughened central portion of the mat, and in each templet the gage openings are so spaced in from the edge that a border of the desired width will be provided as shown in Fig. 4. Owing to the friction between the templet and the mat caused by the lower surface of the templet, the templet and mat may be moved as a unit over the smooth surfaces of the work bed by means of the handles 32, and after the templet has been centered on the mat they are moved until the edge 34 of the templet contacts with the edges 28 of the guides 27. Owing to the overhang of the guides space will be provided for the projecting portion b of the mat which is to be trimmed. The cutting mechanism which is disposed on the same side of the work bed as the guides 27 and 29 is adjusted so as to just clear the edge 34 of the templet when the latter is moved along the guides, and the opposite cutting mechanism is adjusted to just clear the opposite edge 35 of the templet. The templet and mat are then moved as a unit along the work bed, keeping the edge 34 of the templet in contact with the edges 28 of the overhanging guides, and as the edge 34 of the templet passes beyond its coacting cutter said edge is further guided by the continuous guide 29. As the mat is advanced past the cutting mechanisms the projecting superfluous portions b are trimmed off and pass down through the openings 26.

While the guides 27 and 29 are shown in the present instance as fixed, it is obvious that if desired they may be made adjustable, and it is also apparent that any other desired means may be provided for roughening the under surface of the templet in place of the sand paper 33.

It will be seen that by my machine a quick and accurate means for defining and trimming the superfluous edges of a mat is provided.

While the present machine has been particularly designed for trimming the edges of a rubber mat, it is evident that it is of more general application and may be used wherever it is desired to define and trim a border around a specified portion of a sheet of material.

Having thus described my invention, what I claim and desire to protect by Letters Patent is:

1. In a mat trimming machine, a cutting mechanism, means adapted to contact with a mat for defining the portion of the edge thereof to be trimmed, guide means coacting with said first means to properly locate the portion to be trimmed with respect to the cutting mechanism, and means whereby the mat and said first means may be moved past the cutting mechanism.

2. In a mat trimming machine, a bed on which the mat may be moved, a cutting mechanism in operative relation to said bed, a trimming form adapted to be superposed on the mat, means whereby the form may be centered on the mat, and means for guiding the edge of the form in operative relation to the cutting mechanism.

3. In a mat trimming machine, a bed for the mat, a cutting mechanism, a form adapted to be superposed on the mat, and having means for centering it thereon, and a plurality of guides disposed in alinement with the cutting mechanism and adapted to contact with the edge of the form.

4. In a mat trimming machine, a bed for the mat, cutting means disposed on opposite sides of the bed, a form adapted to be superposed on the mat and having means for centering it thereon, and guides for the edge of the form disposed on opposite sides of one of said cutting means and in alinement therewith.

5. In a mat trimming machine, a bed for the mat, cutting means disposed on opposite sides of the bed and adjustable relatively to each other, a form adapted to be superposed on the mat and having means whereby it may be centered thereon, a series of overhanging guides for the edge of the form on one side of one of said cutting means and in alinement therewith, and a guide on the opposite side of said last named cutting means and in alinement with said first mentioned guides.

6. In a mat trimming machine, a bed on which the mat may be moved, spaced cutting means, movable means for defining the finished edges of the mat and provided with means whereby it may be centered on the mat in frictional contact therewith, and fixed overhanging guide means coacting with the finished edge defining means to guide the latter and the subjacent superfluous portions of the mat in proper relation between the cutting means for trimming said superfluous portions.

7. In a mat trimming machine, a bed on which the mat may be moved, cutting means disposed on opposite sides of the bed, a form of a width to just pass between the cutting means and adapted to be centered on the mat, and means at each side of one of said cutting means and in alinement therewith whereby the edges of the form may be guided between the cutting means and the projecting edge portions of the subjacent mat be trimmed.

8. In a mat trimming machine, a bed on which the mat may be moved, a plurality of cutting means, fixed guide means coacting with one of said cutting means, and mat moving and guiding means coacting with the first guide means and adapted to be centered upon the mat in frictional contact therewith.

Signed at New York city, this 20th day of December, 1919.

WILLIAM J. KENT.